No. 888,016. PATENTED MAY 19, 1908.
J. A. JUST.
PROCESS OF PRODUCING DRIED MILK.
APPLICATION FILED NOV. 24, 1906.
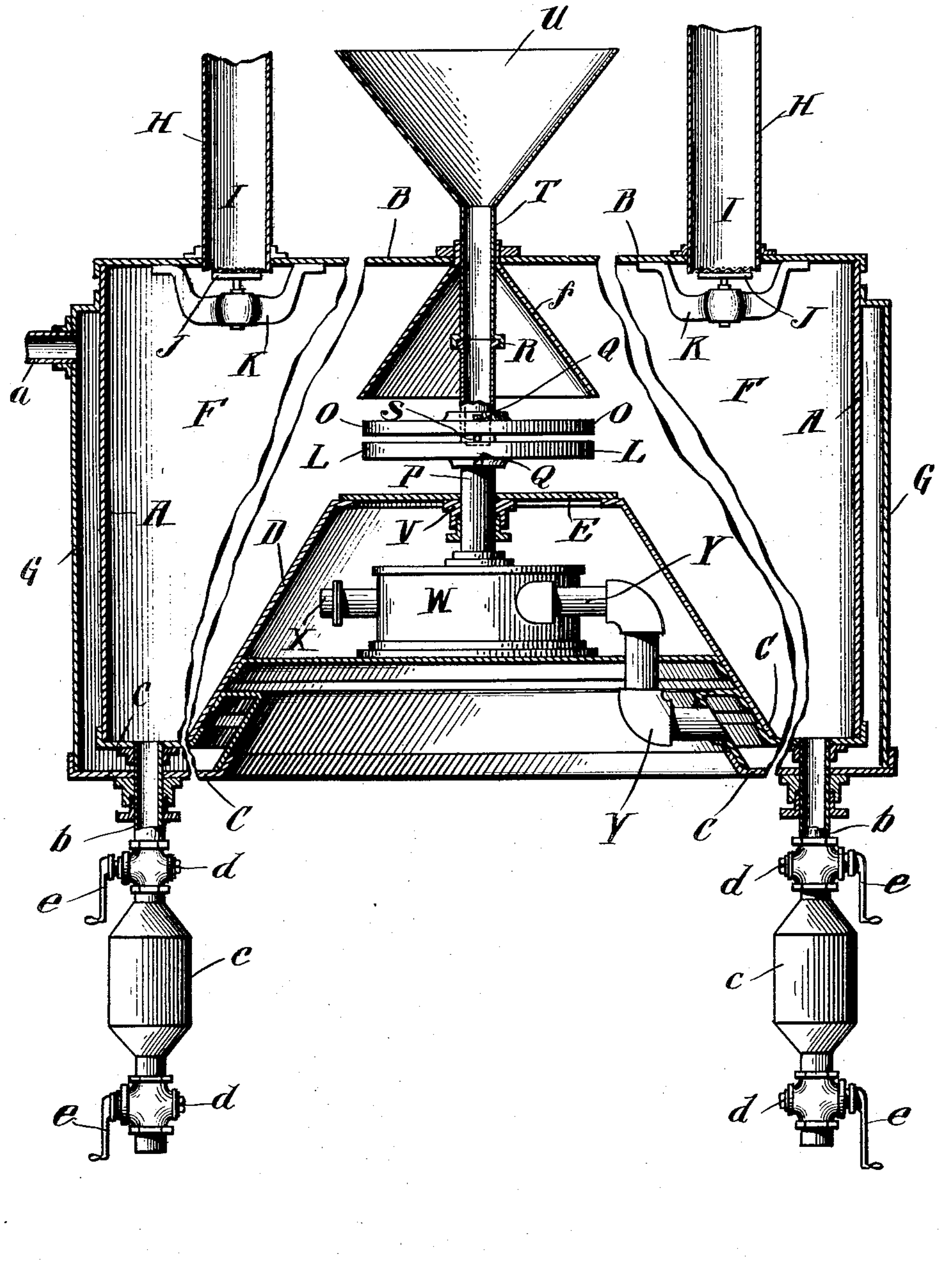
Attest:
C. C. Mitchell
A. L. O'Brien
Inventor:
John A. Just
by Dickerson, Brown, Raegener & Binney Attys.

UNITED STATES PATENT OFFICE.

JOHN A. JUST, OF SYRACUSE, NEW YORK.

PROCESS OF PRODUCING DRIED MILK.

No. 888,016. Specification of Letters Patent. Patented May 19, 1908.

Application filed November 24, 1906. Serial No. 344,897.

*To all whom it may concern:*

Be it known that I, John A. Just, a citizen of the United States, and resident of Syracuse, New York, have invented certain new and useful Improvements in Processes of Producing Dried Milk, of which the following is a specification, accompanied by drawings.

This invention relates to an improved process of evaporating fluids or liquids carrying dissolved solids, as for instance milk or milk like substances, to form dried products, and the object of the invention is to obtain a dry product from such liquids of better quality than heretofore produced, and enable a greater quantity of material to be dried in a given time.

Further objects of the invention will hereinafter appear and to these ends the invention consists of a drying process for carrying out the above objects substantially as hereinafter fully described and claimed in this specification, certain typical arrangements of apparatus suitable in carrying out said process being illustrated by means of the accompanying drawing, which is a longitudinal elevation of the apparatus partly in section.

Referring to the drawings, A represents the walls of a chamber, the top B and the bottom C of which are broken away in their length. Since this chamber may be thirty or forty feet square, the size of the chamber in practice is therefore very much larger in proportion to the remainder of the apparatus than as illustrated. The bottom C is preferably raised or projected inwardly in the form of a truncated cone having the sides D and top E so that the sides D of the cone and the walls A of the chamber form a chute or collecting space for the dry material.

The chamber which will be designated F is provided with a jacket G for steam or other heating fluid, and is also provided with the suction pipes H communicating with the chamber through the top B. Over the openings of the pipes H are provided fine screens I to aid in preventing the dried material from being carried off by the suction. In front of each screen I are placed revolving blades J adapted to be rotated by motors of any suitable character carried by the brackets K and connected to the blades J. The revolving blades J prevent the dried material, which may be in the form of a powder, from passing off through the suction pipes H.

Within the vacuum chamber F are arranged revolving plates L and O adapted to be revolved together in the same direction at a high speed, which may be from two thousand to eighteen thousand revolutions per minute. These disks may be of steel and are adjustably mounted on the shaft P by any suitable means, as for instance the set screws Q, whereby the distance between the inner surfaces of the plates may be adjusted as desired and normally the surfaces of the disks should almost touch. The shaft P extends upwardly to the collar R and the upper portion of the shaft is hollow as partly indicated in dotted lines. A fine aperture S, communicating with the hollow interior of the shaft, is provided between the inner surfaces of the plates L and O to permit the liquid material passing down through the inside of the shaft to pass out between the plates.

The collar or bearing R is carried by the stationary hollow shaft T, suitably supported from the top B of the chamber F and provided with a funnel U. The revolving shaft P is carried in a suitable bearing V in the plate E and is adapted to be driven by any suitable form of motor, as for instance the steam turbine W, provided with the intake X and the exhaust pipe Y, which communicates with the steam jacket G. The jacket is provided with an outlet *a*, and as shown, extends up around the sides of the vacuum chamber F and around the portion of the inner walls D of the chamber. At the lower portions of the chamber F are provided the outlets *b*, communicating with the receiving chambers *c*, which are of sufficient size to receive a substantially large quantity of the dry material. Above and below each receiving chamber *c* are provided the valves *d*, provided with suitable hand operating devices in the form of cranks *e* connected to the valve spindles. These valves *d* may be of any suitable character, preferably one-way valves, and by means of the arrangement of valves shown the material may be withdrawn from the vacuum chamber F without interfering with the normal working conditions of the chamber. When the upper valves *d* are opened the lower valves $d$ are closed, and before the lower valves are opened, the upper valves should be closed, thereby preventing communication of the chamber F with the outside air. Preferably a hood $f$ is provided over the revolving disks L and O to prevent material from falling upon said disks.

According to the construction described, the liquid to be dried passes out of the aperture or apertures S upon the lower revolving plate L, where it forms a layer extending laterally upon all sides with a corresponding diminution of thickness vertically until it becomes so thin that cohesion no longer resists disintegration when the centrifugally severed very fine particles are thrown or discharged radially in a mist-like form, permeating substantially the entire chamber F. In the case of a compound liquid, like milk, the contained droplets of liquid, such as butter fat, are likewise co-extended radially in the same manner as the carrying or emulsifying liquid, and each similarly breaks up into a myriad of smaller particles, each particle however, in the case of milk, being surrounded by a jacketing coat of whey, like the original droplet. Substantially as complete a vacuum as possible should be maintained in the chamber F and the heat of the chamber should be varied in accordance with the nature of the material being operated upon.

In the described operation, using a pair of horizontal disks, the upper disk is mainly useful to regulate the thickness of the initial, or central, layer of milk or other fluid to be dried since the liquid no longer touches it when the layer begins to thin out radially. The two disks being plane faced and parallel the space between them is of the same vertical height at all points while the layer of milk, as long as it persists as a layer, steadily thins out radially and cannot occupy the full vertical space beyond a point near the center. It is necessary that this initial, central, full-height layer of liquid at the center shall be quite thin in order that in thinning down in its radial travel it shall attain a thinness permitting centrifugal disintegration into a mist-like product before reaching the circumference of the lower disk and for this reason the two disks in practice are set very close together.

If liquid milk is being fed to the revolving plate L, the milk is discharged by centrifugal force into the chamber F in atomized form and the moisture passes off through the suction pipes H, while the portion of the milk recovered collects in the lower part of the chamber F in the form of an extremely fine dry powder, which is received in the chamber $c$. When the disks L and O are adjusted very close together almost touching, the milk will be discharged as a mist of excessive fineness which in its travel through the large chamber F will be reduced to a dry powder, but if it is desired to obtain as a product a fluid condensed milk the plates L and O should be adjusted further apart and revolved at a lower speed, thereby permitting a larger quantity of milk to flow on to the plate L and issue from between the plates as a coarser mist, in which latter case the milk will collect in the lower part of the chamber F in condensed form, which may be withdrawn into the receivers $c$. As long as the temperature of the chamber F, the distance apart and the speed of the plates and the quantity of material fed are all maintained substantially constant, a substantially uniform product will be obtained, either as powdered milk or as condensed milk. In either, the product is what is known in the milk art as "homogenized;" that is, the milk fat is contained in the form of smaller globules or particles than in normal fresh milk, or, in other words, the emulsification is carried further than is the case in such fresh milk.

The inner surface of the chamber F may be lined with tin, or tinned steel or iron, which may be readily cleansed and sterilized. The chamber is preferably constructed without corners so that there will be no opportunity for stale products to lodge in the chamber, and consequently little labor is required to maintain the apparatus in a requisite condition to obtain a product free from extraneous contamination.

In order to successfully concentrate or reduce liquid milk to a dry powder, or the so-called condensed form, and in order to obtain a wholesome stable product with all the milk constituents in an unchanged condition, the full milk itself or the separated milk and cream added should be treated to homogenize it, that is, treated in such manner as to cause the cream or fatty portion of the milk to further emulsify with the albuminous portion and salts, in a much more fine emulsification than exists in ordinary milk. This emulsification is accomplished on the revolving plate in the manner stated and when the product is subjected to desiccation in the apparatus described, a condensed milk or dried product will be obtained, which will keep an indefinite time unchanged in a proper package. On redissolving the product with the requisite quantity of water fresh milk is formed like that from which the product was made without the use of any preserving agent whatever. When milk is sprayed in the ordinary manner into a more or less heated atmosphere in order to reduce it to dryness, the final result is different in many ways from that obtained in the operation of my apparatus, the state of emulsification being generally made coarser rather than finer as in the process carried out by my apparatus. One serious fault of the products heretofore obtained by spraying is that the fat quickly becomes rancid and assumes an otherwise disagreeable odor, this being probably due to its existence in a comparatively coarse form in which it is exposed to air.

By atomizing the liquid centrifugally at an extremely high speed as practiced in accordance with my process the dissociation of the various ingredients of the milk is prevented, these ingredients being brought into most intimate contact and association. Ordinary spraying, that is, forcing through a contracted orifice of some kind, tends to dissociate the ingredients of the milk the milk fat and the liquid in which it is suspended having different rates of travel through, and friction upon, the spray nozzle and tending to separate more or less so that some of the albuminous particles may be covered with an excess of fat, when such sprayed particles are exposed to a heated atmosphere in the process of desiccation. Such a product will not keep and becomes rancid quickly, assuming a cheesy ordor, so that for this reason full cream milk has never been successfully desiccated by the spraying process.

By atomizing the milk centrifugally in my apparatus, the product is rendered absolutely uniform and is greatly superior, and is produced at much less cost in a much shorter time than heretofore. Very large quantities of milk can thus be condensed or reduced to a dry powder in a short time. The condensation or reduction of the milk in my process is instantaneous and no changes occur in the milk solids for all harmful reactions require time. Milk as ordinarily condensed in a vacuum pan requires treatment for many hours, according to the capacity of the pan. Frequently five or more tons of milk are placed in these pans at one time and slowly condensed. In my process the milk is supplied in a continuous stream, and the completed product is continuously removed.

The full milk may be separated in an ordinary separator in order to first remove the coarser impurities and dirt generally met with in milk, and by this operation the cream will also be separated. The milk and cream may then be run through a suitable machine to unite and mix the two, the cream being added in proper proportion to the cleansed and separated milk. This mixed milk is then fed into my machine, and is thereby atomized and its constituents brought into intimate contact, infinitely more intimate than existed in the fresh milk. This intimate contact produces a smooth and wholesome article of condensed milk or dry milk powder, all the butter fat being reduced to a state of almost infinite subdivision with each individual particle inclosed by a sealing pellicle of dried milk solubles. If the impurities were not first removed they would concentrate as the milk concentrates and would become more objectionable and pronounced in the finished product, but these impurities are chiefly removed with the dirt or heavy dirt particles. The dirt of raw milk consists of porous spongy matter, which is teeming with a bacteria, and hence my products are especially free from anaerobic and harmful germs.

The condensed milk product may be sweetened or condensed unsweetened, as desired. Milk condensed in the ordinary way in a vacuum pan, on standing, or in a store, often cakes more or less and a portion of the product solidifies to a crystalline mass. Milk condensed by my process will not separate its saline portion from the other ingredients. The dry powder obtained by my process is very uniform, owing to the initial uniformity created in the milk before reducing it to the condensed form or dry powder. The fat globules, which in the original milk are seen under the microscope as fairly far apart and of varying sizes, will be small and very close to each other after the first treatment or additional emulsification; that is, in the still liquid product thrown out by the rotating disk. This intimate emulsification once secured will yield a condensed milk or milk powder, which when mixed with a requisite amount of water for restoring the product the liquid milk will hold its fat uniformly throughout, unlike other milk products in which the fat will rise to the surface when the product is mixed with water. The speed with which cream will rise is, in a way, proportional to the size of the butter fat globules, and in my product these particles of butter fat are almost infinitely fine.

To recapitulate, my process of preparing a dried milk, in its present preferred form, consists in first removing the solid impurities of milk, reuniting the cream and milk if necessary, feeding the milk on the surface of a rapidly rotating disk at a point at or near its center to form a layer, the thickness of this initial layer being regulated by the spacing away of another, vertically adjustable disk above the first and rotating therewith in the same direction, converting this layer into a thin, centrifugally radiating and traveling film of increasing thinness until it becomes too thin to retain its coherence and disintegrates, and discharging the mist-like product formed into a heated and evacuated chamber; the speed of travel of the disks, their distance apart and the feed of milk being so adjusted relatively to the size, evacuation and temperature of the chamber that the fineness of the mist particles will be sufficient to insure their complete desiccation prior to settling to the bottom of the chamber.

I claim and desire to obtain by Letters Patent the following:—

1. In the desiccation of liquids, the process which consists in producing a continuously fed layer of a liquid carrying solids at the center of a rapidly rotating disk, converting the layer into a thin outwardly traveling film, said film increasing in thinness outwardly until it disintegrates radially into a mistlike form, and receiving the mistlike products in a heated chamber maintained under less than atmospheric pressure, the thickness of the initial layer and the speed of the disk being so correlated with the size and evaporative conditions of such chamber that the mist will be fine enough to permit complete desiccation of its particles to a fine powder prior to their settling to the bottom of such chamber.

2. In the desiccation of milk, the process which consists in producing a thin continuously fed layer of milk at the center of a rapidly rotating disk, converting the layer into a thin outwardly traveling film, said film increasing in thinness outwardly until it disintegrates radially into a mistlike form, and receiving the mistlike product in a heated chamber, the thickness of the initial layer and the speed of the disk being so correlated with the size and evaporative conditions of such chamber that the mist will be fine enough to permit complete desiccation of its particles to a fine powder prior to their settling to the bottom of such chamber.

3. In the desiccation of milk, the process which consists in producing a thin continuously fed layer of milk at the center of a rapidly rotating disk, converting the layer into a thin outwardly traveling film, said film increasing in thinness outwardly until it disintegrates radially into a mistlike form, and receiving the mistlike product in a heated chamber maintained under less than atmospheric pressure, the thickness of the initial layer and the speed of the disk being so correlated with the size and evaporative conditions of the chamber that the mist will be fine enough to permit complete desiccation of its particles prior to their settling to the bottom of such chamber.

4. In the desiccation of milk, the process which consists in removing solid impurities from raw milk, producing a thin continuously fed layer of the purified milk at the center of a rapidly rotating disk, converting the layer into a thin outwardly traveling film, said film increasing in thinness outwardly until it disintegrates radially into a mistlike form, and receiving the mistlike product in a heated chamber, the thickness of the initial layer and the speed of the disk being so correlated with the size and evaporative conditions of such chamber that the mist will be fine enough to permit complete desiccation of its particles to a fine powder prior to their settling to the bottom of such chamber.

5. In the desiccation of milk, the process which consists in removing solid impurities from raw milk, producing a thin continuously fed layer of the purified milk at the center of a rapidly rotating disk, converting the layer into a thin outwardly traveling film, said film increasing in thinness outwardly until it disintegrates radially into a mistlike form, and receiving the mistlike product in a heated chamber maintained under less than atmospheric pressure, the thickness of the initial layer and the speed of the disk being so correlated with the size and evaporative conditions of such chamber that the mist will be fine enough to permit complete desiccation of its particles to a fine powder prior to their settling to the bottom.

6. In the desiccation of milk, the process which consists in accelerating the speed of travel of a stream of milk while laterally extending the same until such stream forms a thin layer, continuing the acceleration and extension until the thin layer forms a film of increasing thinness and finally disintegrates into a mistlike form, discharging this mistlike product into a chamber of such size and maintained under such evaporative conditions that the mistlike particles may completely desiccate into a fine powder prior to reaching its bottom, and removing the particles in a dry state.

7. In the desiccation of milk, the process which consists in centrifugally accelerating the speed of travel of a stream of milk while laterally extending the same until such stream forms a thin layer, continuing the acceleration and lateral extension till the thin layer forms a film of increasing thinness and finally disintegrates into a mistlike form, discharging this mistlike product into a chamber of such size and maintained under such evaporative conditions that the mistlike particles may completely desiccate into a fine powder prior to reaching its bottom, and removing the particles in a dry state.

8. In the desiccation of milk, the process which consists in spreading out a continuously flowing stream of milk into a thin layer of predetermined thickness and causing such layer to rotate rapidly until centrifugal action causes it first to form a film of increasing thinness and finally to disintegrate circumferentially into a mistlike form, discharging the mistlike product into a chamber of such size and maintained under such evaporative conditions that the mistlike product may completely desiccate into a dry fine powder prior to reaching its bottom, and removing the dry powder.

9. In the desiccation of milk, the process which consists in delivering milk continuously at the center of a rapidly rotating support and by the action of such support converting the milk into a rotating, continuously flowing layer, maintaining the continuity of said layer as such until centrifugal action thins it to a point where surface tension and cohesion no longer suffice to hold it together and it disintegrates circumferentially into a mistlike form, discharging the mistlike product into a chamber of such size and maintained under such evaporative conditions that the mistlike product may completely desiccate into a dry fine powder prior to reaching its bottom, and removing the dry powder.

In testimony whereof I have signed this specification in the presence of two subscribing witnesses.

JOHN A. JUST.

Witnesses:
OLIN A. FOSTER,
A. L. O'BRIEN.